US006840555B1

(12) United States Patent
Thompson

(10) Patent No.: US 6,840,555 B1
(45) Date of Patent: Jan. 11, 2005

(54) PANELS AND LIFTING IMPLEMENTS THEREFOR

(76) Inventor: Martin Thompson, 5 Woodlands Way, Dymchurch, Kent TN29 OUD (GB)

( * ) Notice: Subject to any disclaimer, the term of this patent is extended or adjusted under 35 U.S.C. 154(b) by 246 days.

(21) Appl. No.: 10/110,146

(22) PCT Filed: Sep. 8, 2000

(86) PCT No.: PCT/GB00/03451

§ 371 (c)(1),
(2), (4) Date: Aug. 9, 2002

(87) PCT Pub. No.: WO01/25132

PCT Pub. Date: Apr. 12, 2001

(30) Foreign Application Priority Data

Oct. 7, 1999 (GB) ............................................ 9923704
Jan. 13, 2000 (GB) ............................................ 0000763

(51) Int. Cl.[7] ................................................ B65G 9/00
(52) U.S. Cl. ........................................ 294/15; 294/19.1
(58) Field of Search .............................. 294/15, 18, 89, 294/19.1; 254/131

(56) References Cited

U.S. PATENT DOCUMENTS 2,263,871 A 11/1941 Duffy
5,462,385 A 10/1995 Mohlengraft

FOREIGN PATENT DOCUMENTS

FR 2549872 2/1985
FR 2702753 9/1994
GB 2261651 5/1993

*Primary Examiner*—Eileen D. Lillis
*Assistant Examiner*—Michael Lowe
(74) *Attorney, Agent, or Firm*—Ostrolenk, Faber, Gerg & Soffen, LLP

(57) ABSTRACT

A lifting implement for removing a panel (10) which has a receiving means (18) in the body of the said panel (10) on the surface of the panel (10) which is exposed in use, the receiving means (18) being offset from the center of the panel (10), from a position in which it is held by gravity in an aperture (12) defined by a surrounding floor or ground surface (14) where the exposed surface of the panel (10) is substantially flush with the surrounding surface (14) comprises a handle (41) with an elongate shift (43) for use by an operator in a standing position, terminating in an engagement member (42) engageable with said receiving means (18), wherein the handle (41) is connected to the engagement member (42) by pivotable means (50), whereby said panel (10) can be removed from said aperture (12), and said handle (41) can move relative to said engagement member (42) during the removal of the panel (10) from the aperture (12), the lifting implement being further provided with restricting means (60) which is movable between a position in which movement of the pivotable means (50) is prevented and a position in which movement of the pivotable means is permitted. A panel system employs these panels in combination with the above-described implement.

35 Claims, 7 Drawing Sheets

PANELS AND LIFTING IMPLEMENTS THEREFOR

This invention relates to panels which rely on gravity to hold them in position such as covers, paving slabs or stones, tiles, screens and such forth, and more particularly to panels which are removable from a floor or ground surface of which they form a part. This invention further relates to lifting implements that can be used to remove such panels.

For some time the concept of using a removable cover which allows access to an area or void underneath the cover has been used successfully in many situations and environments. A simple example is a so-called manhole cover, which can be removed to gain access to an area underground, be it utility supply, a sewer, drain or such like.

The basic use of a removable cover is often applied to many other situations. For example, it is not uncommon to observe access panels in the floors and walls of ships, trains, buses, planes etc., particularly where key areas need to be accessed quickly and easily and where it is impractical or not possible to provide access from another location.

The same concept has made its way into our living and office environments. Greater demands are now placed on maximising the use of space to store safely utilities of various types whilst simultaneously providing access to same.

Offices, warehouses, factories and studios all have service ducts and inspection ducts for housing and carrying pipes, cables and other equipment. Such locations often have suspended floors with voids underneath to carry such items. To this is added a vast increase in data and telecommunication cabling. Air conditioning, heating, electrical and gas supplies have increased the volume of plant and utilities behind walls, under floors and in the ceilings of the places where we work, live and relax. Coupled with this is a desire to have aesthetically pleasing environments where such items are hidden from view.

With access panels, the main consideration is often given to how quickly and easily access to the void behind the panel can be achieved. In many cases, practicality may give way to aesthetic appeal.

For example, with respect to floor panels, these are often configured to be flush with the floor area surrounding the panel. Obviously the main reason for this is for safety, as to allow a portion of the panel to project above the surrounding floor area may result in someone tripping over the panel.

However, having a panel which is simply flush with the surrounding floor area can cause difficulties in removal and replacement of the panel to gain access to the area underneath. Often the method employed in lifting the panel away from the floor is simply to insert a levering device into the gap between the panel and the surrounding floor area. Once a sufficient gap is wedged open the panel can be removed, this usually being achieved by inserting one's fingers into the gap and lifting the panel away from the floor. This may result in injury if one's fingers were caught between the panel and the edge of the surrounding floor area. An appropriate tool could be made available to wedge the panel away from the floor, but invariably what is used is what is at hand, such as a screwdriver, chisel or the like. Such methods can damage the panel and if the panel is frequently removed and replaced, the condition of the panel and particularly the edges of said can rapidly deteriorate. Such panels are typically large, i.e. around 600×600 mm or 750×750 mm, with heavy weights of 11.65 kg and 21.45 kg respectively so that they are retained in position by gravity, and strong so as play their part in supporting whatever furniture or equipment is being supported on the floor.

The method mentioned above is far from ideal in emergencies such as fire or flooding where the panel or a plurality of panels may need to be accessed or replaced very quickly. Existing methods of achieving this may lead to injuries or the misplacement of the panel such that it jams in the surrounding aperture or even falls into the floor void leading to delay and possible damage to equipment. Indeed, applicants were advised that in a real-life situation in a building involving a fire, maintenance staff attempted to use screwdrivers to prise open access panels in the rush to find the seat of the fire. Some maintenance staff incurred injuries to their fingers including a broken finger in once instance and back strains. The result of all this is that the maintenance staff have now refused to remove the panels and rightly so because of the lack of compliance with the UK "Heath & Safety at Work etc. Act 1974", "Management of Health and Safety at Work Regulations 1992" and "Manual Handling Operations Regulations 1992".

So-called manhole covers must be of extremely robust construction given the environment in which they re to be used and are heavy and unwieldy, thereby increasing the possibility of injury, even with current lifting implements, during removing and replacing the cover.

Similar problems can arise in the case of concrete paving slabs, which are also heavy and unwieldy and which have to be relaid from time to time because of unevenness, replaced because of breakage or removed to provide access to underground services.

The problems in removing and replacing an access panel in a floor have already been addressed by accommodating a movable lifting ring in a recess in the exposed surface of the panel. The ring can be lifted up out of the recess to allow once or more fingers to be inserted into the ring, thus the panel can be lifted away from the surrounding area. However, with the heavier and larger panels referred to above the effectiveness of such a lifting ring diminishes significantly. It is often not practical to provide larger ring sizes for larger panels, as to do so would require the provision of a larger recess in the exposed surface of the panel to store the lifting ring. This increases the risk of accidents should, for example, the heel of a shoe be caught within the recess of the ring as someone walks over the panel. This would especially be relevant if, over time or through damage, the lifting ring failed to remain flush with the exposed face of the panel and therefore projected from the recess to form a potential tripping hazard. What is more, such lifting rings are unsightly and may detract from the aesthetic appeal of the exposed surface of the panel.

In all the examples mentioned above, removal of the panel or paving slab away from the floor or ground area involves the physical act of lifting. It is very difficult for the person accessing the panel or paving slab to avoid lifting with the back bent and/or at an awkward angle and always avoid the panel or slab sticking or jamming in the aperture and not lifting away easily. So the risk of back strains or even spinal injuries is ever present with large heavy panels or slabs. Indeed the risk of injury in such circumstances would still be high even if the panel or slab were relatively light and/or relatively small.

An object of the present invention is to provide removable panels and methods and kits of parts for, and for use in, providing or removing panels, covers, paving slabs or stones, tiles, screens and any other panel-like elements which rely on gravity to hold them in position which overcome or at least substantially reduce the aforementioned disadvantages and problems. Hereinafter such a panel, cover, paving slab, paving stone, tile, screen or other panel-like element will be generically referred to, for convenience, as a "panel".

A further object of the present invention is to provide a lifting implement whereby such panels can be removed conveniently and with reduced risk of injury to the operator.

Accordingly in one aspect, the invention resides in a panel that is removable from a position in which it is held by gravity in an aperture defined by a surrounding floor, wall or ground surface where the exposed surface of the panel is flush with the surrounding surface, the said panel being provided with a reinforcing insert having an outer rim defining an opening, said reinforcing insert being held within the body of the said panel such that the said outer rim is flush with that surface of the said panel which is exposed in use, said reinforcing insert being adapted to receive through said opening, and be engaged by, a lifting implement whereby the said panel is removable from the said aperture.

The provision of a reinforcing insert within the body of the panel permits the positive engagement of the lifting implement within the body of the panel, thus allowing the safe and controlled removal of the panel from the aperture. This greatly reduces the chances of the panel being dropped and slot back into the aperture and even jamming same. Moreover in an emergency situation in which the panel covers an access aperture to services, the speed at which the panel can be removed from the aperture is increased. Also, the risks of injury caused by dropping or mishandling the panel can be reduces to the point of non-existence, thereby providing considerable health and safety advantages. Indeed, applicants believe that their invention satisfies "The Provisions and Use of Work Equipment Regulations 1998".

By means of the reinforcing insert, the lifting implement can be engaged with the body of the panel and the panel removed from the aperture without the need for crude levering tools traditionally used for such a task, such as screwdrivers, chisels, etc. Therefore, unnecessary damage to the edges of the panel and possibly the floor or wall surface defining the aperture can be avoided. This is of particular importance if the panel needs to be removed frequently from the aperture, as consistent and frequent damage to the edges of the panel could result in the panel or the surrounding floor, wall or ground surface having to be replaced much earlier than expected or planned, with consequential increased costs. Moreover, if there is nay delay in making good the damage, this may present a health and safety hazard.

The invention makes for a versatility which has not hitherto been possible as the panels with their reinforcing inserts are not only applicable to service ducts but also can be used to form an entire floor area or large portions of same by supporting the panels from a variety of supporting means, for example, a number of adjustable props such as screw jacks, above a subfloor, which maybe of concrete construction.

The reinforcing insert acts as an engagement interface between the body of the panel and the lifting implement and protects the panel from damage by frequent engagement with the lifting implement.

By virtue of the ease of operation, simplicity and low cost of manufacture, and health and safety characteristics, the invention is of considerable commercial significance.

The reinforcing insert may be located in any suitable position within the body of the panel, but in order to facilitate lifting of the panel from the aperture and to minimise any risk of back strain and injury, the reinforcing insert is preferably offset from the centre of the panel and advantageously adjacent an edge of the panel. A single reinforcing insert is usually all that is required by two or more reinforcing inserts may be provided if desired or necessary.

The reinforcing insert may be provided with the body of the panel during manufacture, for example when the panel is made of a mouldable material such as a suitable plastics material, for example a resin, or a cementitious material such as concrete. Alternatively, a hole is made within the body of the panel as by drilling for example, and the reinforcing insert is inserted into the hole so that its outer rim is flush with the surrounding floor, wall or ground surface. The hole may be in the form of a "blind" hold or a through-hole and the reinforcing insert can be in the form of an open-ended sleeve or a sleeve that has one end which is the lowermost in use closed, like a thimble. The use of a blind hold or a reinforcing insert with a closed end is preferred because it prevents, say in the case of a floor panel, draughts, flows of gas or the transmission of deleterious substances through the panel from a service duct, or in the case of a panel in the form of paving slab, emissions from a broken sewer.

Ideally, the internal dimensions of the opening of the reinforcing insert should be such that the insert itself does not form a health and safety hazard, for example, to those walking over the panel if the reinforcing insert is provided within a ground or floor panel and additionally allows the overall aesthetic appeal of the panel to be maintained.

The reinforcing insert may be held within the body of the panel by a variety of holding means consistent with maintaining the reinforcing insert held within the panel despite repeated removal and replacement operations. This can be achieved by a suitable adhesive, an external thread, ribbing, ridging or rivets, a combination of any of these methods, or by any other suitable means.

Preferably the external thread is a coarse thread and/or a multi-start thread which bites into the wall of the hole by a sufficient amount to hold the reinforcing insert within the body of the panel whilst facilitating speed of insertion into the hole. Speed of insertion is further facilitated by the external wall of the reinforcing insert being of a frusto-conical shape.

To ensure more readily that the reinforcing insert is flush with the surrounding surface, the opening preferably has a countersunk mouth and the outer rim of the reinforcing insert is in the form of an outwardly projecting peripheral lip which fits within the countersunk mouth.

The means whereby the insert is engaged by the lifting implement can be of any suitable form consistent with obtaining a positive engagement and therefore optimal lifting purchase in the comparatively short time. For example, the reinforcing insert may be hollow with its internal wall being of cylindrical shape and internally threaded to be engageable by a complementary external thread on the lifting implement.

Alternatively, the hollow reinforcing insert may provide a passage, for example in the form of a slot, the passage having a shoulder beneath which a projection on the lifting implement can be positively engaged by turning the lifting implement in relation to the reinforcing insert.

In another aspect the invention resides in a method of providing a panel that is removable from a position in which It is held by gravity in an aperture defined by a surrounding floor, wall or ground surface where the exposed surface of the panel is flush with the surrounding surface, said method including providing a panel with a reinforcing insert having an outer rim defining an opening, said insert being held within the body of the said panel such that the outer rim is flush with that surface of the panel which is exposed in use, said reinforcing insert being adapted to receive through said opening, and be engaged by, a lifting implement whereby the said panel is removable from the aperture.

From a further aspect the present invention resides in a kit of parts comprising a reinforcing insert having an outer rim defining an opening and being adapted to be held within the body of a panel that is removable from a position in which it is held by gravity in an aperture defined by a surrounding floor, wall or ground surface where the exposed surface of the panel is flush with the surrounding surface such that the outer rim is flush with that surface of the panel which is exposed in use, and a lifting implement which is engageable within the said reinforcing insert.

The kit of parts may also include a panel having any of the other feature referred to hereinabove.

In yet another aspect the invention resides in a lifting implement for removing a panel from an aperture as aforesaid, the said lifting implement comprising a handle terminating in an engagement member, wherein the said engagement member is receivable through the opening of, and engagement within, the reinforcing insert of any of the panels defined hereinabove.

By means of the lifting implement, the panel may be easily and safely removed.

More particularly, the use of a lifting implement which positively engages within the body of the panel via the reinforcing insert allows the panel to be removed from the aperture without risk of injury. So, there is no need for a person to bend and strain their back and injure their hand or fingers by catching them between the edges of the panel and the aperture in the surrounding surface.

The engagement member of the lifting implement can be of any suitable form consistent with obtaining a positive engagement with the reinforcing insert and therefore optimal lifting purchase in a comparatively short time. For example, the engagement member may be provided with an external screw thread which is complementary to and engageable with the internal screw thread of the reinforcing insert.

Alternatively, the engagement member may be provided with an outwardly extending projection, the engagement member being insertable in a passage in the reinforcing insert which provides a shoulder beneath which the projection on the lifting implement can be positively engaged by turning the lifting implement in relation to the reinforcing insert.

In yet another alternative, the engagement member may be provided with at least one engagement element that is movable between a first position in which the said at least one engagement element permits entry of the engagement member through the opening of the reinforcing insert and into a passage defined by the reinforcing inserted and a second position in which the said at least one engagement element is actuated to hold the engagement member within the reinforcing insert.

To move the said at least one engagement element between the first and second positions an actuating member may be provided which acts in use upon the said at least one engagement element when the engagement member reaches the bottom of the passage.

Preferably, the said at least one engagement element may take the form of a plurality of balls or movable gripping lugs which are supported by the engagement member into an annular recess in the wall of the passage in the said second position to hold the engagement member within the reinforcing insert.

In order to prevent damage to the engagement member and the reinforcing insert by over-engaging the lifting implement, and also to signal full engagement for optimum lifting as well as to provide for a more solid connection between the two, the lifting implement is advantageously provided with a surface which abuts against the exposed surface of the panel.

There may be situations where the panel may not be simply removed out of the aperture. For example, the weight or dimensions of the panel may be such that a pivot motion, perhaps using an edge of the aperture itself as a fulcrum, is needed to remove the panel from the aperture. For this reason, the lifting implement is advantageously connected to the engagement member by pivotable means which may be of any suitable form, such as a simple hinge for movement in one place or a universal joint like a ball and socket joint.

When pivotable means are provided, the actuating member for the said at least one engagement element may be constituted by such pivotable means which is actuated when the pivotable means in operated.

To ensure that the panel is not subjected to sudden uncontrolled movements during lifting, it is preferably to provide restricting means which will allow the pivoting of the engagement member relative to the elongate element only when required. Such restricting means may conveniently take the form of an outer sleeve, biased, for example by the compression spring, to cover the pivotable means between the engagement member and the elongate element. When pivoting of the lifting implement is required, the outer sleeve may be moved sufficiently against the bias to allow motion of the pivotable means.

By providing a lifting implement with pivotable means with or without the restricting means, the versatility and safety characteristics of the lifting implement are considerably improved.

It will be appreciated that the lifting implement of the present invention is of general application. It is preferred to use the lifting implement with the panel according to the present invention. However, the lifting implement can be used with any suitable panel having a receiving means in the body of the panel on the surface of the panel which is exposed in use, the receiving means being offset from the centre of the panel, and the receiving means being adapted to be engaged by the engagement member of the lifting implement.

The invention also comprehends a method of removing any of the panels defined hereinabove from a position in which the panel is held by gravity in an aperture defined by a surrounding floor, wall or ground surface where the exposed surface of the panel is flush with the surrounding surface and there being a reinforcing insert held in the body of the panel utilising any of the lifting implements defined hereinabove by engaging the lifting implement in the said reinforcing insert and operating the said lifting implement to remove the panel from the aperture.

In order that the invention may be more readily understood, reference will now be made, by way of example only, to the accompanying drawings in which.

Figure 1:
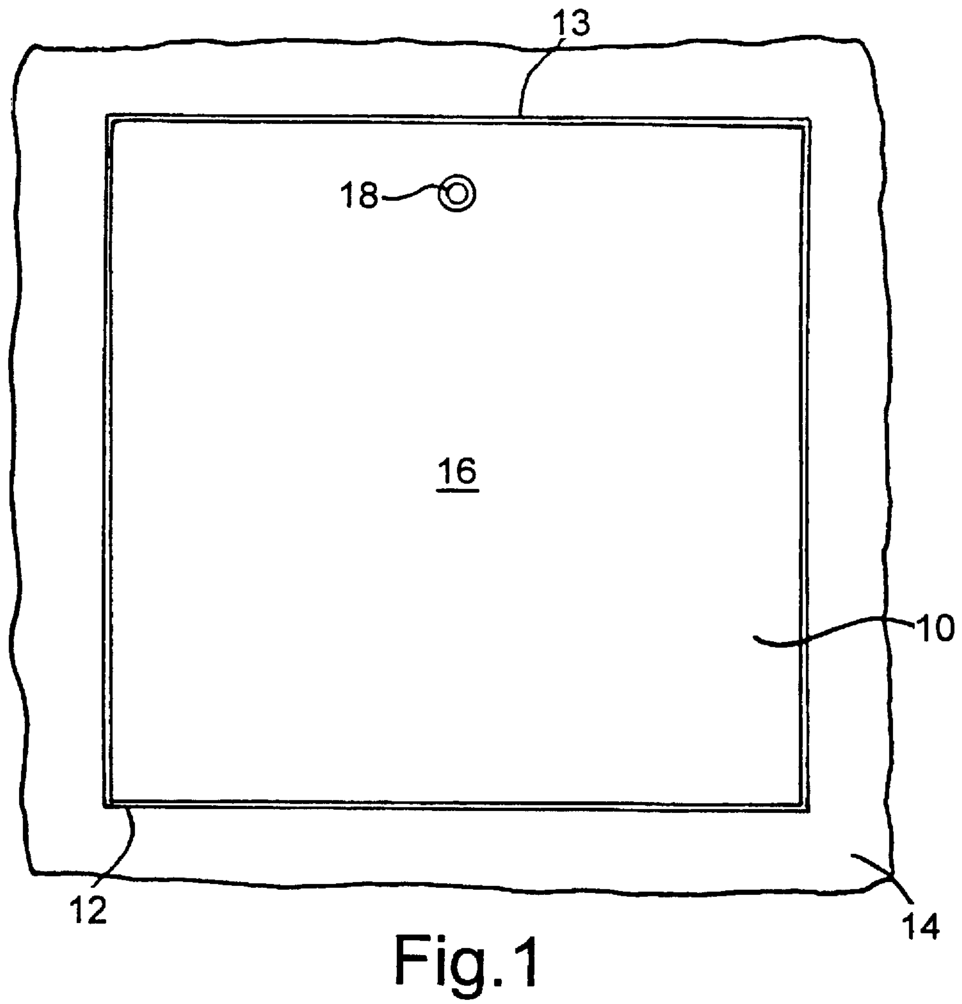
FIG. 1 is a plan view of a removable floor panel forming part of a floor which surrounds the panel and which is constructed in accordance with the invention.
Figure 2:
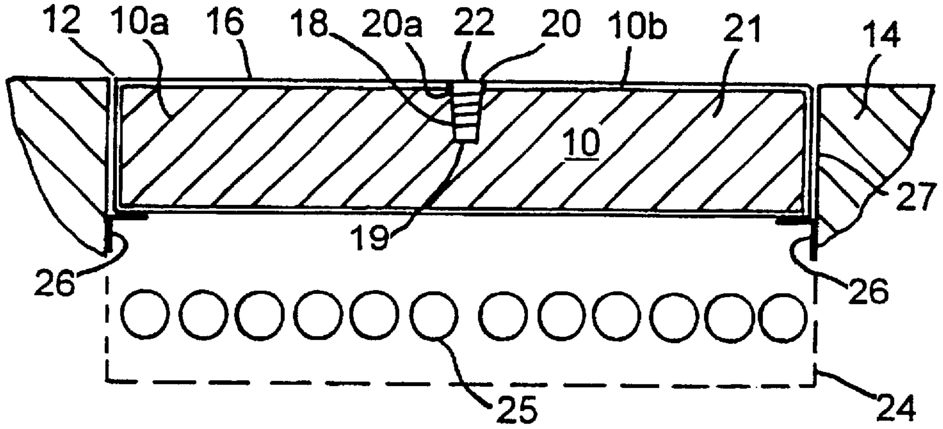
FIG. 2 is a cross-section through the floor panel of FIG. 1 to expose, in part-sectional said elevation, a reinforcing insert forming part of the panel.
Figure 2A:
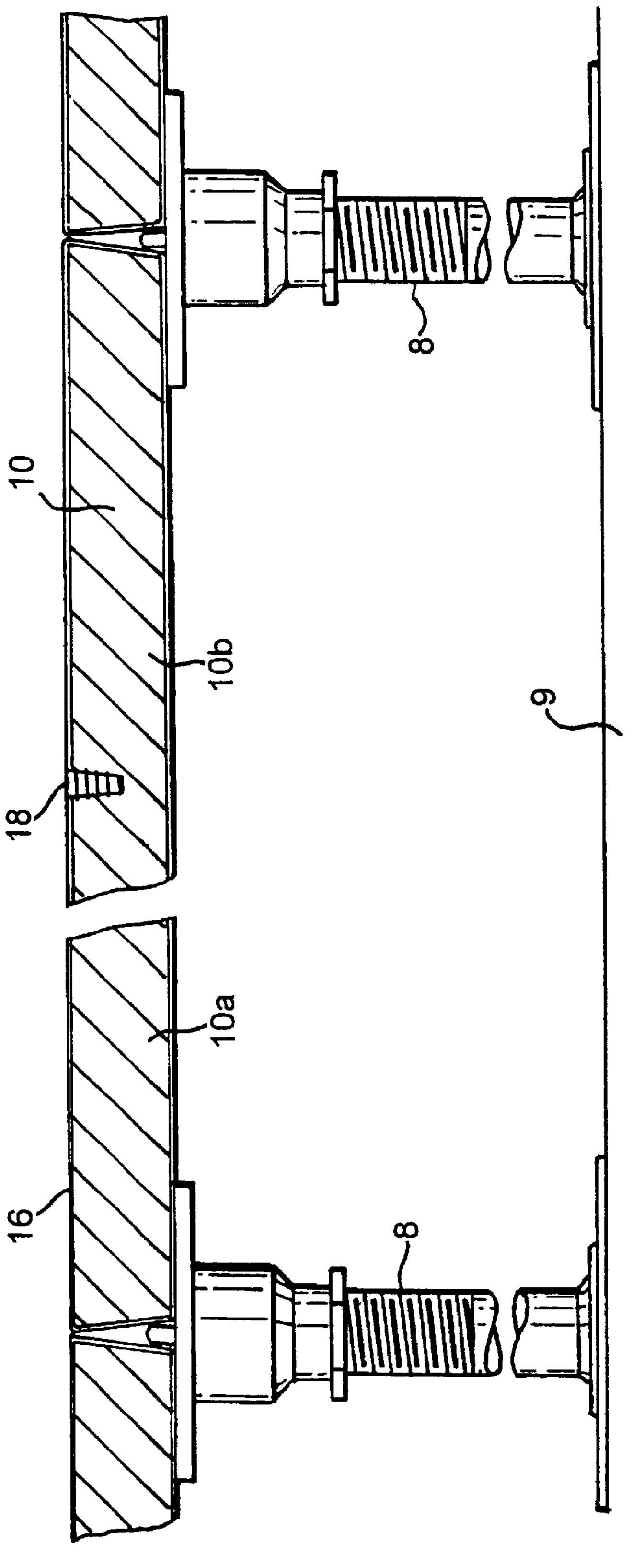
Figure 3:
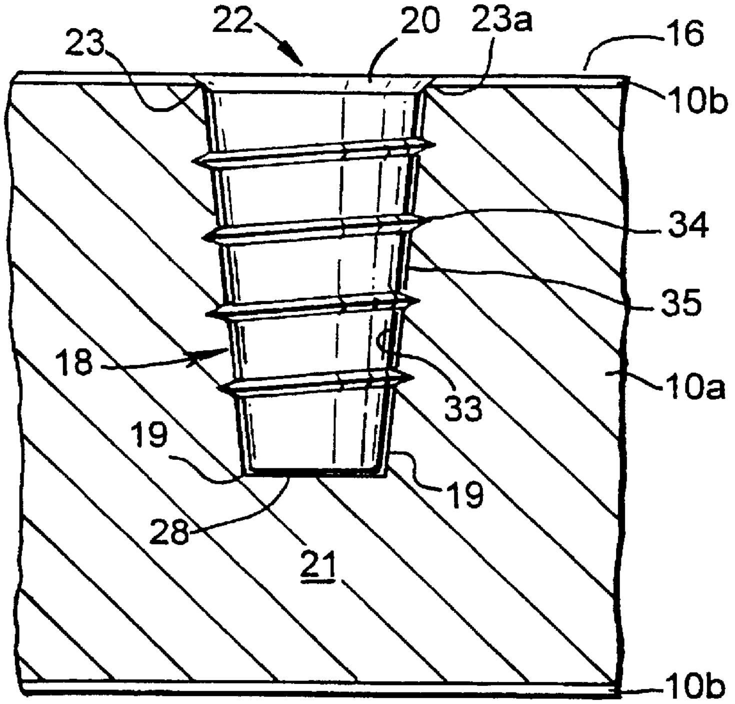
Figure 4:
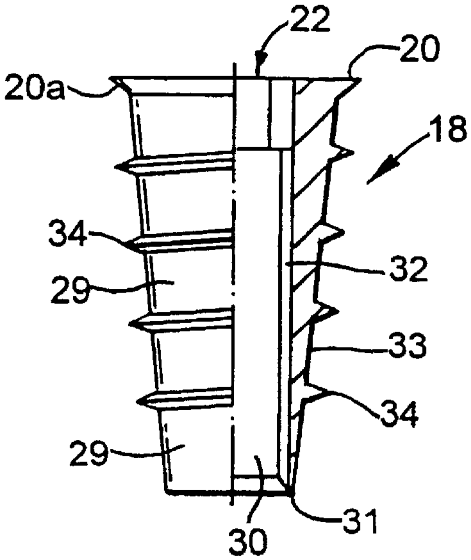
Figure 5:
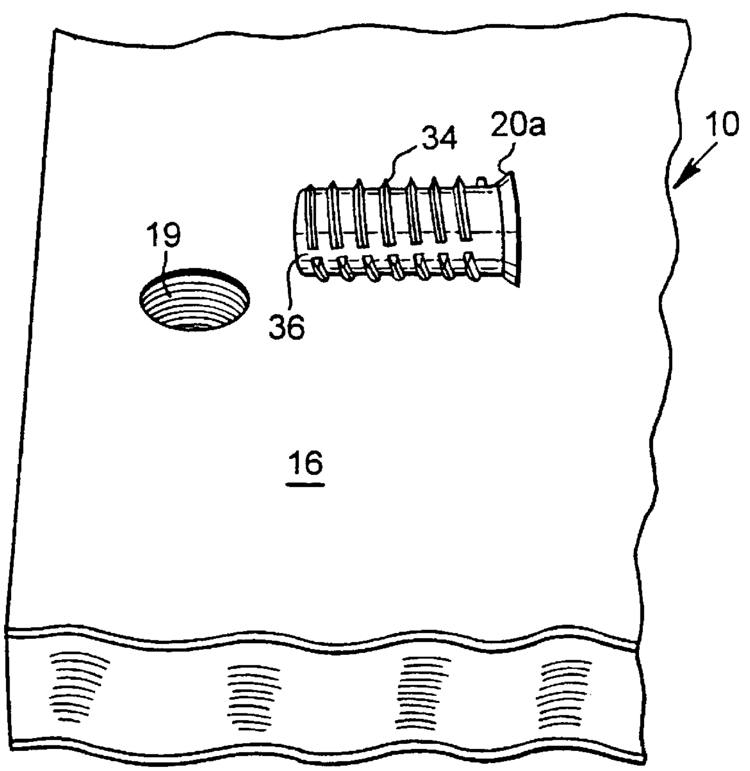
Figure 6:
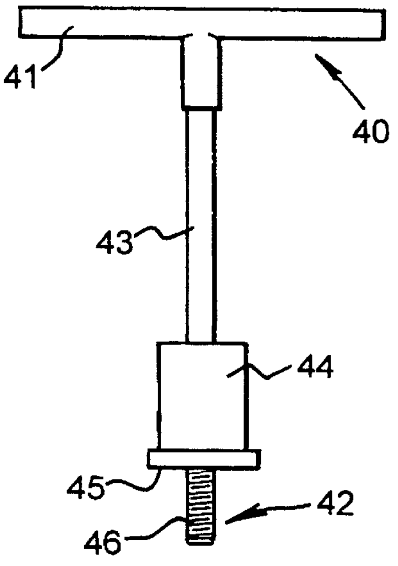
Figure 7:
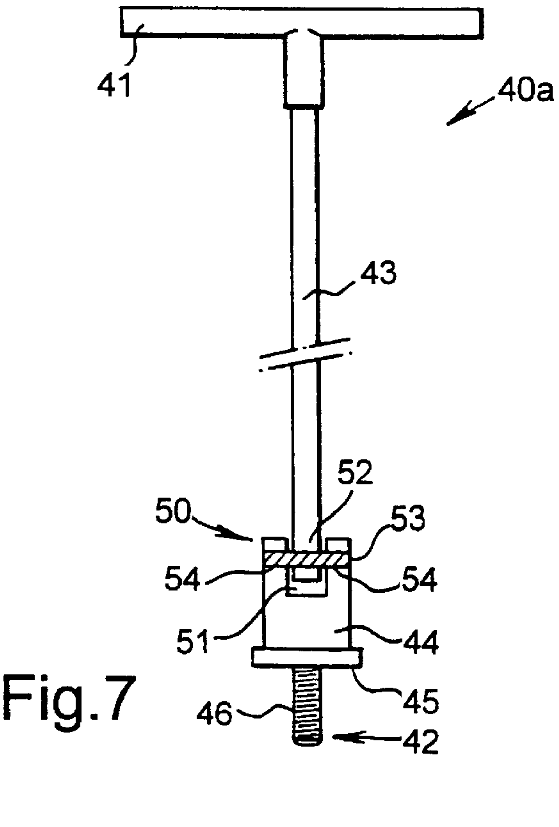
Figure 8:
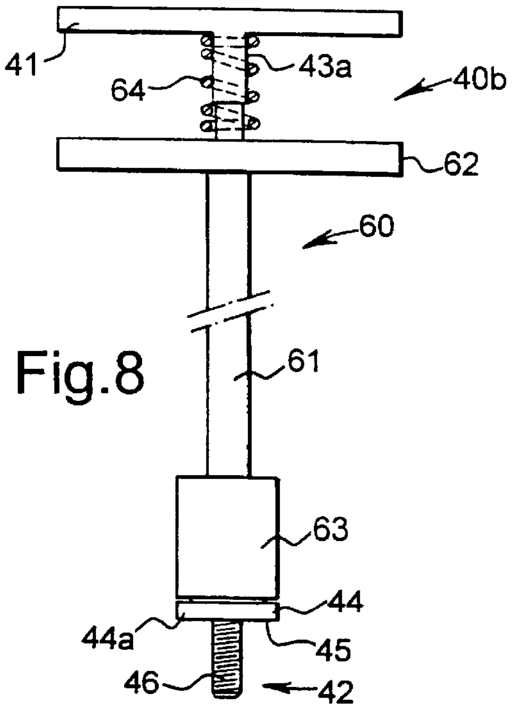
Figure 9:
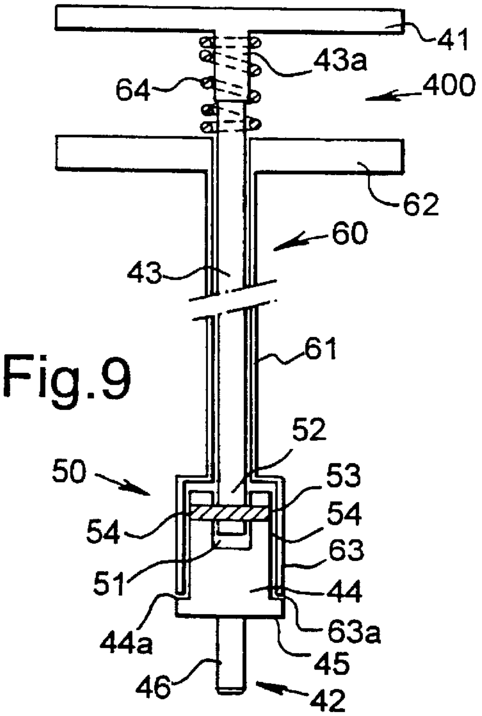
Figure 10:
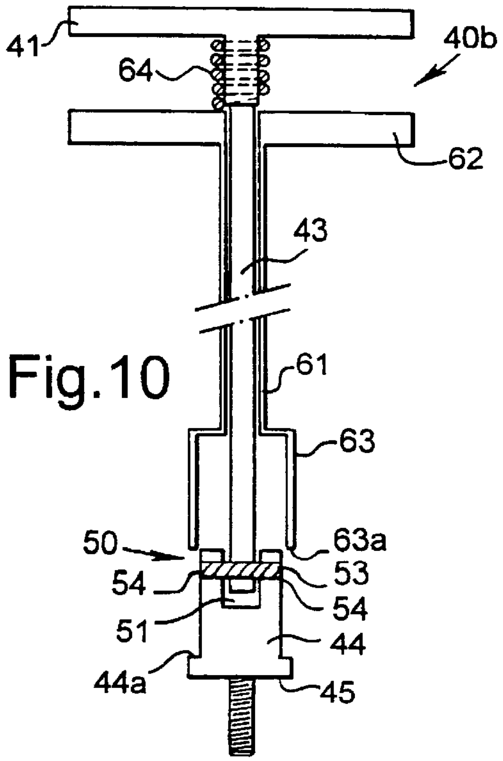

FIG. 2*a* is a part-sectional side elevation of an alternative construction which is a further cross-section of the floor panel of FIG. 2 with its reinforcing insert;

FIG. 3 is a detail view of the floor panel and reinforcing insert of FIG. 2 to an enlarged scale;

FIG. 4 is a part-sectional side elevation of the reinforcing insert of FIG. 3;

FIG. 5 is side elevation of the reinforcing insert of FIG. 4, laid on its side on a panel;

FIG. 6 is a side elevation of one embodiment of lifting implement which is adapted to engage within the reinforcing insert to lift the removable panel from the floor;

FIG. 7 is a side elevation of another embodiment of lifting implement;

FIGS. 8 and 9 are a side elevation and a part-sectional side elevation respectively of a further embodiment of lifting implement in one position;

FIG. 10 is a part-sectional side elevation showing the lifting implement of FIGS. 8 and 9 in another position; and FIG. 11 to 14 show a method of removing the floor panel of FIGS. 1 and 2 from the floor using the lifting implement of FIGS. 8 to 10.

Figure 15:
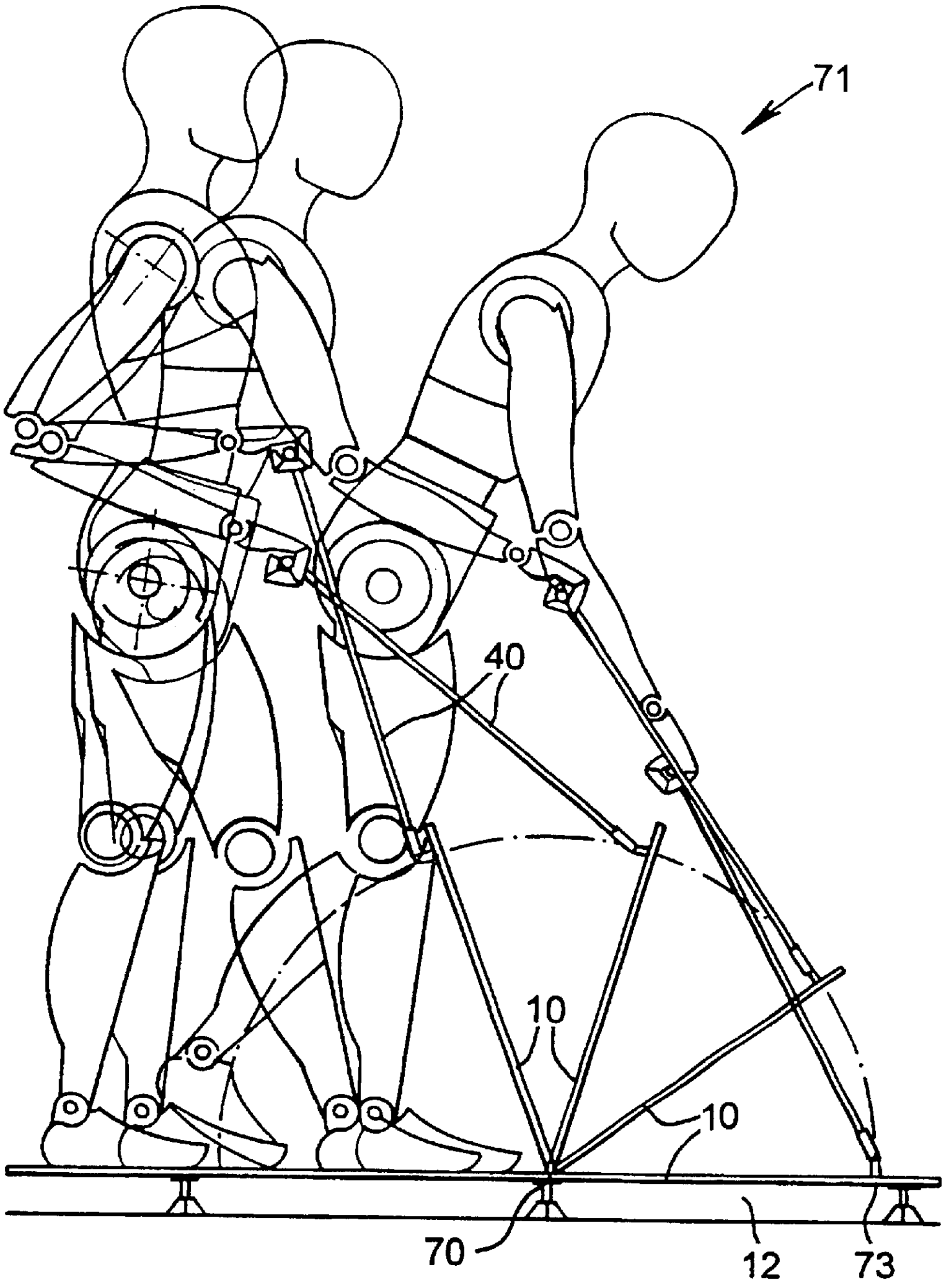

FIG. 15 shows a further, preferred method of removing a floor panel from the floor using the lifting implement of FIGS. 8 to 10.

Referring to FIGS. 1 and 2 of the drawings, there is shown a rectangular panel 10, in this case a floor tile, that is removable form a position in which it is held by gravity in an aperture 12 defined by a surrounding floor, wall or ground surface 14 where the exposed (outer) surface 16 of the panel 10 is flush with the surrounding surface 14. The panel 10 is provided with a hollow reinforcing insert 18 in the form of a stud having an outer rim 20 in the form of an outwardly projecting peripheral lip defining an opening 22. The stud insert 18 is held within the body 21 of the panel in a hole 19 such that the outer rim 20 is flush with the exposed surface 16 of the panel. A bevel 20*a* is provided on the under surface of the rim 20. The stud insert 18 is adapted to be received through the opening 22, and be engaged by, a lifting implement, to be described, to remove the panel 10 from the aperture 12. To facilitate lifting, the reinforcing insert 18 is offset from the centre of the panel 10 at a location adjacent one edge 13 of the four edges of the panel 10.

As will be more readily appreciated from FIG. 2, the panel 10 is an access panel for a service duct 24 housing service lines such as any of electricity, computer, telephone, fax and ISDN lines, central heating, gas and water supply conduits, which are collectively indicated by the reference 25, for the purpose of allowing easy, quick and hazard free access to the service duct for installation, maintenance and repair, in particular in the case of an emergency such as fire or flood. The panel 10 rests on supports 26 to close a service access opening 27 in the service duct 24.

Instead of covering a service duct 24, FIG. 2*a* shows the panel 10 and its reinforcing insert 18 forming part of a suspended floor area above a subfloor 9 and which is supported by adjustable props in the form of screw jacks 8. This form of suspended floor construction allows any area of beneath a plurality of the said panels 10 to be accessed at a given moment and is particularly useful where frequent access to the subfloor is required.

Referring now to FIG. 2, the panel 10 is made of a solid core 10*a* of wood, or wood composite such as chipboard, with an external surrounding sheath 10*b* of steel which imparts the requisite strength. Practically, however, the panel 10 can be constructed of any other suitable natural or synthetic material such as plastics, metal, concrete, marble, slate or any combination of materials that gives the requisite strength and weight. The dimensions of the panel 10 and thus of the aperture 12 and service access opening 27 are sufficient to enable ease of access into the service duct 24 through the aperture 12 and service access opening 27. Although, for clarity of illustration, gaps are shown between the panel 10 and the surrounding floor surface 12, in practice, these gaps will not be present. Typical sizes for the panel 10 are 600 mm by 600 mm square with a weight of 11.65 kg and 750 mm by 750 mm square with a weight of 21.45 kg. This enables the panel 10 to sit snugly and firmly within the aperture 12 to remain flush with the surrounding floor surface 14, with the panel strength enabling the panel to support the weight of whatever is carried by the panel and surrounding surface, for example, furniture and office equipment such as computers, photocopies, etc. The exposed surface 16 of the panel 10 may be presented by whatever is the particular floor covering of the surrounding surface 14, for example by a floor tile such as a carpet tile, or a resin coating. Clearly, the reinforcing stud insert 18, by definition, must be of a stronger and harder material that that of the core 10*a* to be able to fulfil its reinforcing function and to withstand repeated engagement and disengagement with the lifting implement. In this instance, the reinforcing stud insert 18 is made of steel.

Drilling is the method of choice for forming the hole 19 in the body 21 of the panel 10 without going all the way through so as to form a "blind" hole, either during manufacture of the panel 10 or in an existing panel 10 in situ. The drilling process involves forming the blind hold 19 with a countersunk mouth 23 having a bevel 23*a* and a closed end 28.

FIG. 3 shows more fully how the stud insert 18 is inserted into the hole 19 and held within the body 21 of the panel 10. Referring to FIGS. 3 and 4, the stud insert 18 is in the form of an open-ended sleeve 29 having the entry opening 22 for the lifting implement at that end which is the uppermost in use and defining a cylindrical passage 30 extending between the rim 20 defining the entry opening 22 and the lowermost, in use, open end 31. The cylindrical internal wall of the passage 30 of the sleeve 29 has an internal multi-start coarse screw thread 32 which is engageable by a complimentary external multi-start coarse screw thread on the lifting implement in a manner to be described. The sleeve 29 has an external frusto-conical surface 33 provided with a coarse external screw thread 34 which bites into the wall 35 of the hole 19 by a sufficient amount so that the stud insert 18 is held within the body of the panel 10 against repeated engagement and lifting by the lifting implement.

Speed of insertion of the stud insert 18 into the hole 19 by means of a screwing action is facilitated by the coarse screw thread 34 and frusto-conical external surface 33. As shown in FIG. 5, this example of the invention has the screw thread 34 interrupted to provide two longitudinal channels 36 (only one visible) which permit ease of exit of panel material removed from the wall 35 of the hole 19 by the action of screwing the stud insert 18 into the hole 19. Although not normally strictly necessary, a suitable adhesive may be used to enhance the holding of the stud insert 18 within the body of the panel 10 by applying it to the hole 19 prior to screwing in the stud insert 18. The bevel 23*a* of the countersunk mouth 23 receives the outer rim 20 which, by virtue of its bevel 20*a* being of complementary shape to the countersunk bevel 23*a*, ensures that the outer rim 20 is flush with the exposed surface 16 of the panel 10.

The opening 22 of the stud insert 18 is of a size which, in addition to the bevels 23*a* and 20*a* providing for flush mounting of the stud insert with the panel surface 16, guards against or even prevents the stud insert forming a health and safety hazard, for example, to those walking over the panel 10. Moreover, the opening size and flush mounting allow the overall aesthetic appeal of the panel to be maintained. This will be more readily appreciated from FIG. 1 which shows that the side of the opening 22 is very small in relation to the overall size of the panel and will be virtually unnoticed in a floor surface. Typical sized for opening 22 are 8 mm to 10 mm diameter, depending upon where the panel is laid.

Referring to FIG. 6, this shows a lifting implement 40 having a handle 41 terminating in a stud insert elongate engagement member 42 to which the handle 41 is rigidly connected via a shaft 43 and an enlargement 44 which is rigid with the shaft and has a panel abutment surface 45. The engagement member 42 has a coarse multi-start external screw thread 46 which is engageable with the internal screw thread 32 of the reinforcing insert 18 by presenting the free end of the engagement member 42 to the opening 22. The lifting implement 40 is turned to inter engage the respective screw threads 46 and 32 with each other and turning is continued until it is stopped by abutment of abutment surface 45 with the rim 20 and exposed surface 16 of the panel 10. So, the abutment surface 45 acts as a stop to prevent over-turning of the lifting implement 40 with consequential damage to the reinforcing insert 18 and also prevents bending of the threaded elongate engagement member 42. Thus, the combination of the multi-start coarse threaded engagement member 42 and multi-start coarse threaded stud insert 18 with the abutment surface 45 not only prevents damage to the lifting implement 40 but ensures positive engagement and optimal lifting purchase in a very short time.

The lifting implement 40*a* shown in FIG. 7 differs from that of FIG. 6 in that a pivotable means constituted by a pivotal connection 50 in the form of a hinge is provided between the handle 41 and the engagement member 42 for enabling the handle 41 to move relative to the engagement member 42 during the removal of the panel 10 from the aperture 12. The pivotal connection 50 comprises a pivot recess 51 in the enlargement 44 into which a free end region 52 of the shaft 43 projects and a pivot pin 53 which is rigid with the shaft 43 projects readily outwards of the free end region 52 and into bearing holes 54 in the walls of the recess 51.

Whilst the embodiment of FIGS. 8 and 9 has a pivotal connection 50 between the handle 41 and the engagement member 42, the lifting implement 40*b* differs from that of FIG. 7 by having a restricting means that is generally indicated by the reference 60 and which is moveable between a position in which movement of the pivotal connection 50 is prevented and permitted respectively. The restricting means comprises a tubular member 61 within which the shaft 43 of the handle 41 is telescopically mounted, a gripping member 62 like the handle 41 and a tubular sleeve 63 mounted on the enlargement 44 which are rigid respectively with the proximal end of the shaft 43 adjacent the handle 41 and with distal end of the shaft 43 adjacent the pivotal connection 50.

Biasing means in the form of a compression spring 64 encircles a normally exposed length 43*a* of the shaft 43 lying between the handle 41 and the gripping member 62. The spring 64 acts on the gripping member 62 and tubular member 61 to urge the tubular sleeve 63 into position shown in FIG. 9 in which the sleeve 63 normally covers the pivotal connection 50 to prevent movement of the handle 41 relative to the engagement member 42. In the normally covered position, the tubular sleeve 63 surrounds the enlargement 44 which acts as a guide with the free end 63*a* of the tubular sleeve 63 being urged into abutment with a radial flange 44*a* acting as an end stop to delimit the amount "covering" movement of the tubular sleeve 63. To uncover the pivotal connection 50, with both hands holding the handle 41, the gripping member 62 is gripped by the figures of both hands and moved towards the handle 41 against the bias of the spring 64 with the sleeve 63 being moved with the gripping member 62 via the tubular member 61 and with respect to the enlargement 44 until, at full or substantially full spring compression, as shown in FIG. 10, the sleeve clears the enlargement 44 and uncovers the pivotal connection 50 to permit movement of the handle 41 relative to the engagement member 42.

In all the embodiments of FIGS. 6, 7 and 8 to 10, the engagement member 42 is turned and screwed into the stud insert 18 of the panel 10 until the abutment surface 45 of the enlargement 44 abuts against the outer rim 20 of the stud insert 18 and exposed surface 16 of panel 10 as shown in FIG. 10, although in FIG. 10 a normally non-existent gap is shown between the surface 16 and rim 20 and abutment surface 45 for clarity of illustration. It is then a simple matter for the maintenance worker to grasp the handle 41 with both hands, bend the knees and ten, keeping the back straight, lift the panel 10 temporarily onto an edge 70 shown in dashed lines of the aperture 12, by straightening the knees, whereafter the panel is immediately removed from the aperture 12.

In the case of FIG. 6, the panel 10 has again to be lifted by raising the handle 41 of the lifting implement 40, as well as a dragging motion which is not easily accomplished and whilst a considerable improvement on existing techniques can, if not handled carefully, result in a maintenance worker incurring back strain. This potential problem is largely solved by the use of a pivotal connection 50 in the embodiment of FIG. 7 because once the panel 10 has been lifted onto the edge 70 of the aperture 12, the handle 41 can be pivotally moved in relation to the engagement member 42 in the stud insert 18 to occupy a position in which the shaft 43 is as a suitable angle with respect to the engagement member 42 that facilitates removal because the lifting implement 40*a* is pulled with both hands through the handle 41 to remove the panel 10 from the aperture 12 with a sliding motion over the surrounding surface 14.

However, there is still a risk with the embodiment of FIG. 7 that the movable pivotal connection 50 will permit sudden, unrestrained and uncontrollable movements of the panel 10 with respect to the handle 41 which could result in back strain or injury. Whilst such a risk would not occur with the embodiment of FIG. 6 because the handle 41 is rigid with the engagement member 42, this embodiment has disadvantages which have already been mentioned.

Figure 12:
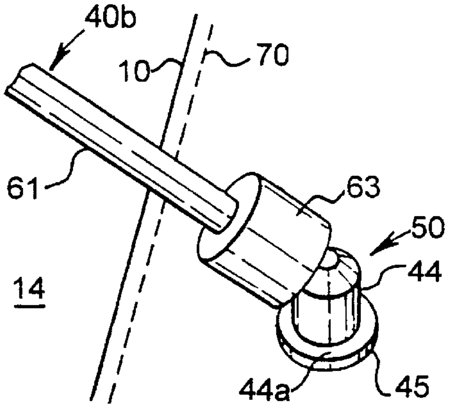
Figure 13:
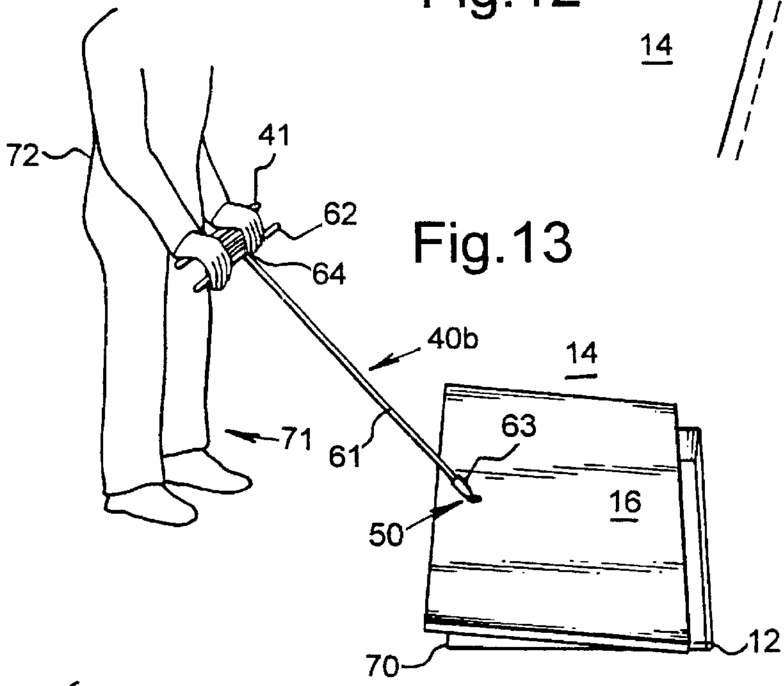
Figure 14:
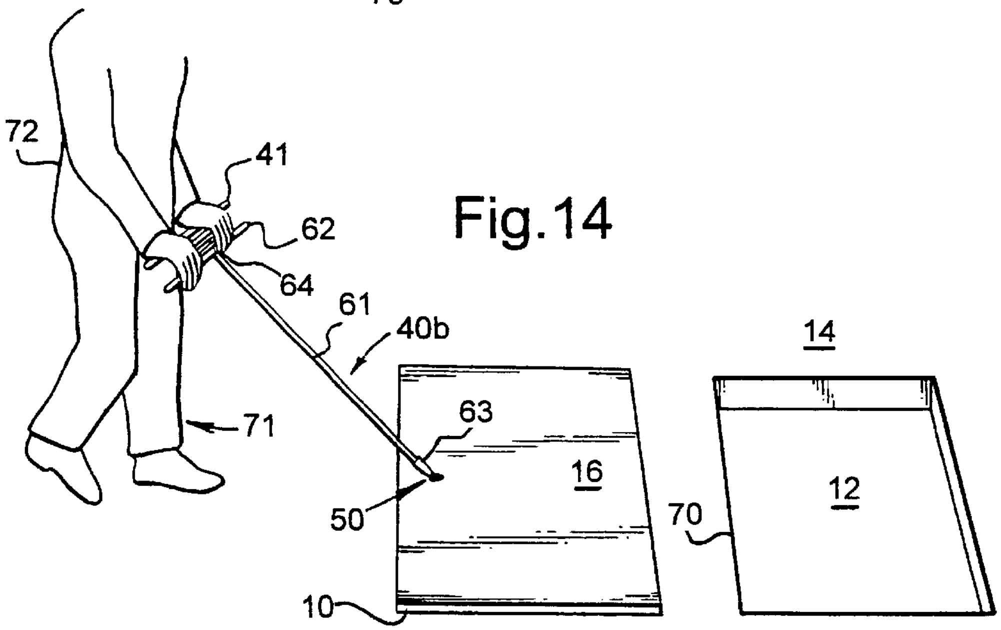

The embodiment of FIGS. 8 to 10, has the advantages of both FIGS. 6 and 7 by immobilising the pivotal connection 50 so that the handle 41 is a rigid with the engagement member 42 when lifting the panel 10 but permits immediate freeing of the pivotal connection 50 by pulling the gripping member 62 towards the handle 41 into the position of FIG. 10 when the panel 10 has been lifted onto the edge 70 of the aperture 12, as shown in FIGS. 12 and 13. Then, by gripping both the gripping member 62 and handle 41 against the biasing action of the spring 64, as shown in FIGS. 13 and 14, the panel 10 can be pulled from the aperture 12 and slid along the surrounding surface 14 by a maintenance worker 71 as will be apparent from FIG. 14. A pulling motion with the maintenance worker's back 72 straight, as illustrated, maximises what strength the maintenance worker 71 has without putting the worker at risk from back strain and injury.

Figure 11:
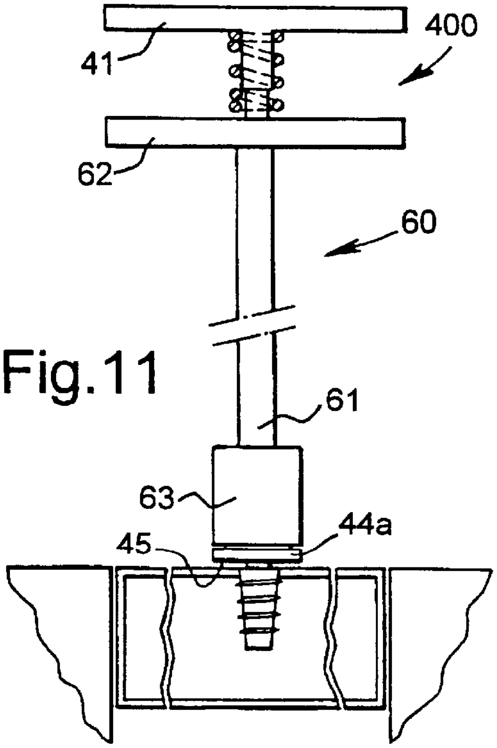

The gripping member 62 can then be released from the position shown in FIG. 10 in which the restricting means 60 uncovers the pivotal connection 50 to occupy the position shown in FIG. 11 in which the released spring 62 has moved the sleeve 63 back to where it covers the pivotal connection 50, the lifting implement can be turned to unscrew the threaded engagement member 42 from the stud insert 18 to be available for another lifting operation. It will be appreciated that the lifting implement 40*b* of FIGS. 8 to 10 and shown in action removing a panel 10 form the aperture 12 in FIGS. 12 to 14 has significant health and safety advantages.

An alternative, preferred way in which to employ the lifting implement of the present invention is shown in FIG. 15. The panel 10 lies in aperture 12. The worker 71 inserts the engagement member 42 of the lifting implement 40 into the receiving means 73 of the panel 10. The pivotal connection 50 is released as described above in the description relating to FIGS. 8 to 14. The worker 71 then stands to the side of the panel 10 distal to the receiving means 73. Then, while remaining standing throughout, the worker simply lifts and moves backwards. As shown, the panel 10 is then removed from the aperture 12 while pivoting on the edge 70.

Whilst the invention has been described primarily with respect to the use of the panel 10 in relation to a floor surface, the panel 10 is also suitable for use in a wall and in an exterior environment. For instance, the panel 10 may be a paving slab for use in a sidewalk, pavement, garden or park under which is laid, for example, a drain, pipe, telephone, television, and electric cables and gas lines. In this situation it may be undesirable to have the area underneath the slab empty, in which case the slab may rest on sand or earth. The paving slab is removed in the same way as described and the exposed earth or sand underneath the paving slab is dug up to gain access to the drain, pipe, telephone, television and electric cables or gas lines.

For security, the reinforcing insert of the panel and the engagement member of the lifting implement can be custom made for a particular customer, so that only that particular lifting implement will be engageable with those particular panels.

What is claimed is:

1. A lifting implement for removing a panel which has a receiving means in the body of the said panel on the surface of the panel which is exposed in use, the receiving means being offset from the centre of the panel, from a position in which it is held by gravity in an aperture defined by a surrounding floor or ground surface where the exposed surface of the panel is substantially flush with the surrounding surface, the said lifting implement comprising a handle with an elongate shaft for use by an operator in a standing position, terminating in an engagement member engageable with said receiving means, wherein the handle is connected to the engagement member by pivotable means, whereby said panel can be removed from said aperture, and said handle can move relative to said engagement member during the removal of the panel from the aperture, the lifting implement being further provided with restricting means which is movable between a position in which movement of the pivotable means is prevented and a position in which movement of the pivotable means is permitted.

2. A lifting implement as claimed in claim 1, wherein the lifting implement is provided with a surface that is located between the handle and the engagement member and which abuts against the exposed surface of the panel to act as a stop and to prevent bending of the engagement member during the removal of the panel from the aperture.

3. A lifting implement as claimed in claim 1, wherein the restricting means comprises a sleeve which normally covers the pivotable means to prevent the said movement of the handle relative to the engagement means and which is moveable to uncover the pivotable means to permit the said relative movement of the handle.

4. A lifting implement as claimed in claim 1, wherein biasing means is provided to urge the restricting means into the position in which the relative movement of the handle is prevented.

5. A lifting implement as claimed in claim 4, wherein the biasing means is a compression spring.

6. A lifting implement as claimed in claim 4, wherein the pivotable means is connected to the shaft which is telescopically mounted within a tubular member that is rigid with the sleeve at one end and a gripping member at its other end, with the said biasing means acting between the handle and the gripping member such that movement of the gripping member towards the said handle moves the sleeve and uncovers the pivotable means to permit movement of the handle relative to the engagement member.

7. A lifting implement as claimed in claim 6, wherein the biasing means urge a sleeve against a stop to delimit the amount of covering movement of the sleeve.

8. A lifting implement as claimed in claim 1, wherein the said pivotable means is a hinge or a universal joint.

9. A lifting implement as claimed in claim 1, wherein the engagement member is provided with an external thread which is engageable with an internal thread provided in the receiving means of the panel.

10. A lifting implement as claimed in claim 1, wherein the engagement member is provided with an outwardly extending projection such that the engagement member is insertable in a passage provided in the receiving means that provides a shoulder beneath which the projection on the lifting implement can be positively engaged by turning the lifting implement in relation to the receiving means.

11. A lifting implement as claimed in claim 1, wherein the engagement member is provided with at least one engagement element that is movable between the first position in which the said at least one engagement element permits entry of the engagement member through an opening provided in the receiving means and into a passage defined by the receiving means and a second position in which the said at least one engagement element is actuated to hold the engagement member within the receiving means.

12. A lifting implement as claimed in claim 11, wherein an actuating member is provided which acts in use upon the said at least one engagement element when the engagement member reaches the bottom of the passage to move the said at least one engagement element between the first and second positions.

13. A lifting implement as claimed in claim 12, wherein the actuating member is constituted by the said pivotable means such that the actuating member is actuated when the said pivotable means is operated.

14. A lifting implement as claimed in claim 11, wherein the said at least one engagement element takes the form of a plurality of elements which are supported by the engagement member and are inoperable in the said first position and which project from the engagement member into an annular recess in the wall of the passage in the said second position to hold the engagement member within the reinforcing insert.

15. A panel system comprising a plurality of panels, each being removable from a position in which it is held by gravity in an aperture defined by a surrounding floor or ground surface where the exposed surface of the panel is flush with the surrounding surface, each said panel being provided with a reinforcing insert having an outer rim defining an opening, said reinforcing insert being held in the body of the said panel such that the said outer rim is flush with the surface of the said panel which is exposed in use, said reinforcing insert being adapted to receive through said opening, and the engaged by, a lifting implement whereby the said panel is removable from the said aperture; and one or more lifting implements according to claim 1.

16. A panel system as claimed in claim 15, wherein the reinforcing insert is offset from the centre of the panel.

17. A panel system as claimed in claim 16, wherein the reinforcing insert is adjacent an edge of the panel.

18. A panel system as claimed in claim 15, wherein the opening of the reinforcing insert has an internal dimension which is such as to guard against the reinforcing insert being a health and safety hazard.

19. A panel system as claimed in claim 15, wherein the internal dimension of the opening of the reinforcing insert is between 8 mm and 10 mm.

20. A panel system as claimed in claim 15, wherein the reinforcing insert is in the form of a sleeve having said outer rim and said opening at one end and another opening at its other end.

21. A panel system as claimed in claim 15, wherein the reinforcing insert is in the form of a sleeve having said outer rim and said opening at one end and its other end closed.

22. A panel system as claimed in claim 15, wherein the reinforcing insert is provided with means for holding the reinforcing insert within the body of the panel.

23. A panel system as claimed in claim 22, wherein the holding means is an external thread.

24. A panel system as claimed in claim 23, wherein the holding means is a coarse external screw thread.

25. A panel system as claimed in claim 15, wherein the reinforcing insert is of frustoconical external shape.

26. A panel system as claimed in claim 15, wherein the reinforcing insert is hollow and has an internal wall of cylindrical shape which is internally threaded to be engageable by a complimentary external thread on the lifting implement.

27. A panel system as claimed in claim 26, wherein the internal thread of the reinforcing insert is a coarse screw thread.

28. A panel system as claimed in claim 26, wherein the internal thread of the reinforcing insert is a multi-start screw thread.

29. A panel system as claimed in claim 15, wherein the reinforcing insert is hollow and provides an internal passage having a shoulder beneath which a projection on the lifting implement can be positively engaged by turning the lifting implement in relation to the reinforcing insert.

30. A panel system as claimed in claim 15, wherein the said outer rim of the reinforcing insert is in the form of an outwardly projecting peripheral lip.

31. A panel system as claimed in claim 15, wherein the panel is moulded and the reinforcing insert moulded into the panel.

32. A panel system as claimed in claim 15, wherein the reinforcing insert is inserted in a hole in the panel.

33. A panel system as claimed in claim 32, wherein the hole is in the form of a "blind" hole or a through-hole.

34. A panel system as claimed in claim 32, wherein the hole has a countersunk mouth within which the outer rim fits.

35. A panel system as claimed in claim 32, wherein the hole is provided with an adhesive for use in holding the reinforcing insert within the body of the panel.

* * * * *